May 2, 1961     F. J. KRUMMEL     2,982,513
PULP STOCK VALVES
Filed Oct. 24, 1957     2 Sheets-Sheet 1
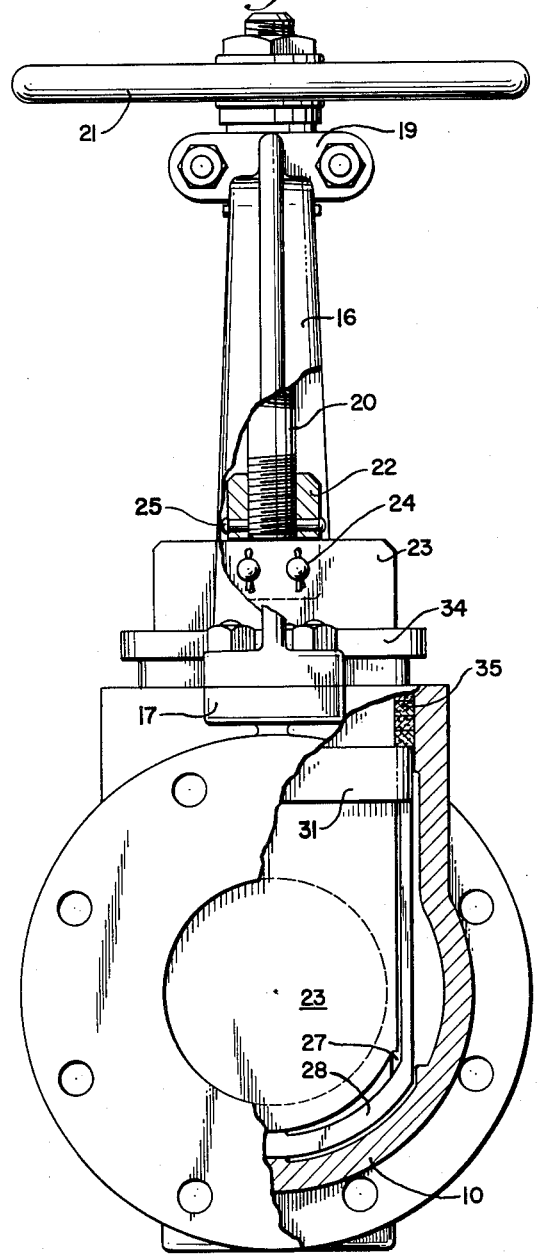
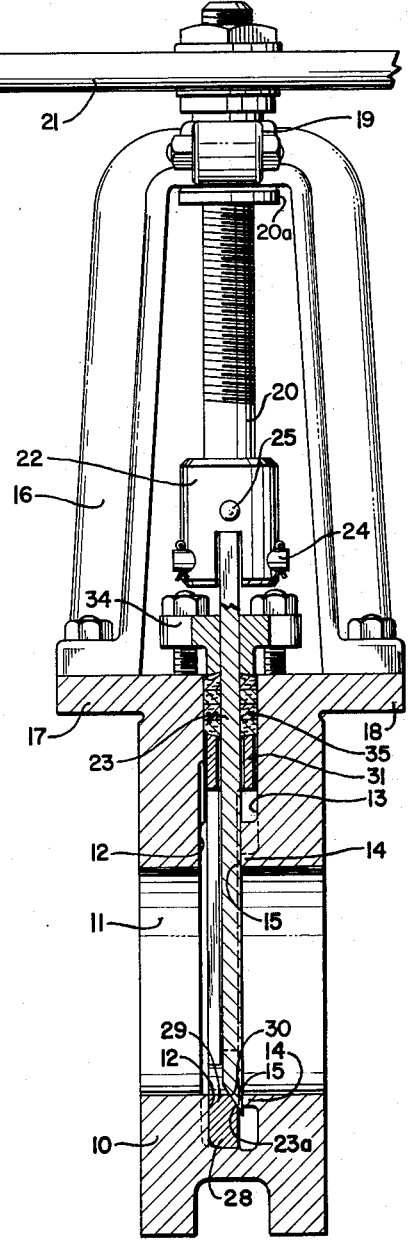
INVENTOR.
FREDERICK J. KRUMMEL
ATTORNEYS.

INVENTOR.
FREDERICK J. KRUMMEL
ATTORNEYS.

United States Patent Office 2,982,513
Patented May 2, 1961

2,982,513

PULP STOCK VALVES

Frederick J. Krummel, East St. Louis, Ill., assignor to Walworth Company, New York, N.Y., a corporation of Massachusetts Filed Oct. 24, 1957, Ser. No. 692,177

2 Claims. (Cl. 251—203)

The invention relates to gate valves, and particularly to a pulp stock valve for controlling the flow of semi-solids, such as the fibrous slurries commonly transmitted in the manufacture of paper products.

Summary

I have discovered an improved gate valve for controlling the flow of materials. According to my invention, it is possible to manufacture such a valve without utilizing the conventional split or bi-member construction of the main body of the valve. Thus, my improved gate valve eliminates the possibility of leakage at the juncture of the two halves of the valve body by eliminating the juncture itself, while increasing the strength of the valve and decreasing its manufacturing costs.

The valve of my invention comprises, in essence, a main body having a flow passage therethrough and a gate member for closing the flow passage. In order to properly guide the gate member, a guide member within the main body is provided. The guide member has an opening aligned with the flow passage. Means are provided for moving the gate member so as to open and close the flow passage. This construction permits the use of a unitary main body for the valve, with a consequent decrease in cost. Since no joints are required in the main body, leakage from the valve is greatly reduced if not entirely eliminated.

Description

In the drawings, wherein I have illustrated the best mode contemplated by me for carrying out my invention:

Fig. 1 is an end elevational view of my improved valve, with portions broken away and other portions in cross-section.

Fig. 2 is a side elevational view of the valve of Fig. 1, with portions being shown in cross-section.

Figure 3:
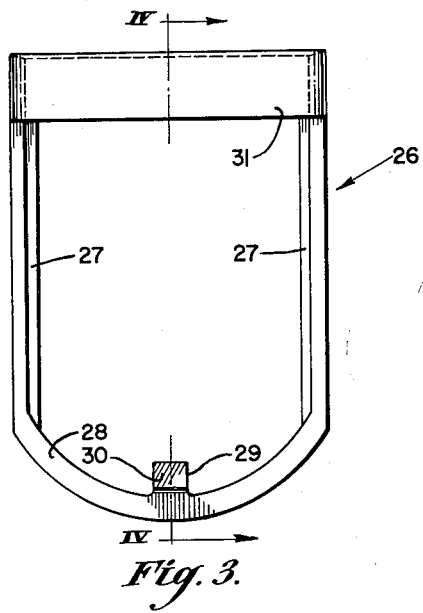
Fig. 3 is a front elevation view of the guide member of the invention.

Referring to Figs. 1 and 2, there is shown a valve for controlling the flow of material which has a main body 10 with a transversely extending bore or flow passage 11 therethrough. The main body is adapted to be connected to two sections of fluid carrying pipe (not shown), which have an interior diameter approximately the same as the diameter of the flow passage. Located intermediate the inlet and outlet ends of flow passage 11 is a groove 12 extending radially outwardly from the surface of flow passage 11. A slot 13 extends from the upper portion of annular groove 12 through the main body to the top surface thereof. An inwardly extending abutment 14 is provided about the inner peripheral edge of annular groove 12. This abutment forms a continuous annular flat surface 15 which extends radially from and is adjacent to flow passage 11. The purpose of this flat surface will be described infra.

Yoke 16 secured to shoulders 17 and 18 on body 10 has a vertically extending bore (not shown) with upper portion 19. Screw threaded valve stem member 20 passes through the double flanged yoke nut 20a which has a hand wheel 21 at its upper end. Connected to the lower end of stem member 20 is a gate coupling 22. Gate member or wedge 23 is attached to coupling 22 as by pins 24 passing therethrough. The lower edge of gate member 23 is arcuate and has a downwardly inclined edge 23a. As best can be seen in Figs. 1 and 2, stem member 20 is anti-rotationally attached to coupling 22 as by pin 25 to prevent stem from rotating with yoke nut 20a when handwheel and yoke nut is rotated. Coupling 22 is slotted sufficiently wide as to permit the gate to move slightly to the right or left (as seen in Fig. 2).

Figure 4:
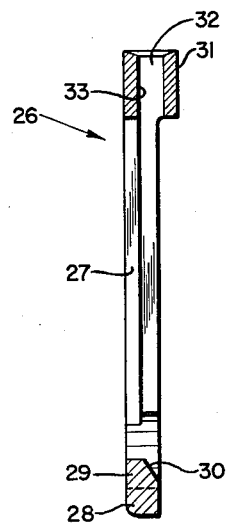
Fig. 4 is a cross-sectional view of the guide member taken along the line IV—IV of Fig. 3 looking in the direction of the arrows.

A guide member 26, seen best in Figs. 3 and 4, fits into slot 13 and annular groove 12. The guide member has an open central portion which is larger than the flow passage, so that when the guide member is seated it does not obstruct the flow passage. The sides of the guide member are straight and have inwardly extending flanges 27 thereon, which have a flat forward surface. The lower connecting web 28 of the guide member is arcuate and has an upwardly extending lip 29 in the center thereof, the front edge of the lip being inclined, as at 30. In order to properly guide the gate member, the upper connecting web 31 of guide member 26 has a slot 32 extending therethrough, the inner rear surface 33 of which is parallel to the front surfaces of flanges 27.

The packing gland 34 for the gate member may be attached to main body 10, if desired. In order to prevent the leakage of fluid through slot 13, packing 35 may be positioned above guide member 26, so as to bear against the walls of slot 13 and the surfaces of gate member 23.

In the closing operation, as the valve stem member 20 is moved downwardly by turning handwheel 21, gate member 23 moves downwardly until its inclined lower edge 23a engages inclined lip 30 of guide member 26. Further downward movement of valve stem member 20 causes lip 30 to force gate member 23 to the right, as seen in Fig. 2, so that the righthand face of the gate is forced against flat surface 15 to completely seal the flow passage. In order to insure a fluid-tight seal, the two contacting surfaces should be machined. To re-open the flow passage the hand wheel is turned in the opposite direction thereby causing valve stem member 20 to move upwardly and pull gate member 23 out of the path of flow through passage 11.

The construction described above results in a lower cost of manufacture, since less material is needed, and because annular surface 15 can be easily machined prior to the seating of guide member 26. The possibility of leakage is reduced to a minimum since there are no openings or joints in the sides and the bottom of valve body 10.

The terms and expressions which I have employed are used in a descriptive and not a limiting sense, and I have no intention of excluding such equivalents of the invention described, or of portions thereof, as fall within the scope of the claims.

I claim:

1. A pulp stock valve comprising an all-metal main body having a flow passage, said main body being formed as an integral unit and having a radially extending slot which surrounds and intersects said flow passage, so as to form a flat perpendicular surface around said flow passage, a vertically movable gate for closing said flow passage, the bottom edge of said gate being downwardly inclined, an integrally formed separate removable guide member mounted within said slot and having straight sides for guiding said gate and having an aperture between said sides aligned with and larger than said flow passage, an integral inclined lip on the bottom portion of said guide member which extends upwardly into the aperture in said guide member and is aligned with the line of motion of the center portion of said inclined edge, means connected to the center portion of said gate for moving said gate downwardly so that the center portion of said inclined edge engages said inclined lip as said gate moves downwardly thereby urging said gate against said flat surface to form a fluid tight seal therebetween, and a packing gland closing said slot and including packing means in said slot forming a fluid tight seal between said gate and said body and confining said guide member within said slot.

2. A pulp stock valve comprising an all-metal one piece main body having a flow passage therethrough and a transverse slot therein intersecting said flow passage and bordered by a valve seat on said body surrounding said flow passage, a gate slidable through said slot to open and close said flow passage, a separate removable guide member for said gate positioned within said slot and having an opening therein aligned with said flow passage and having straight sides guiding sliding movements of said gate, said slot receiving and positioning said guide member and gate, wedging means on said guide member acting against an edge of the gate to urge said gate against said valve seat and thereby prevent leakage between said gate and said surface, and a packing gland including packing means between said gate and body closing said slot in said body and confining said guide member within said slot.

References Cited in the file of this patent

UNITED STATES PATENTS

| | | |
|---|---|---|
| 1,482,836 | Brubaker | Feb. 5, 1924 |
| 2,064,567 | Riley | Dec. 15, 1936 |
| 2,065,628 | Taylor | Dec. 29, 1936 |
| 2,130,652 | Robeson | Sept. 20, 1938 |
| 2,351,775 | McMurry | June 20, 1944 |
| 2,550,984 | Ferguson | May 1, 1957 |
| 2,873,943 | Williams | Feb. 17, 1959 |

FOREIGN PATENTS

| | | |
|---|---|---|
| 1,102,145 | France | May 4, 1955 |